United States Patent [19]

Steahly

[11] Patent Number: 4,889,011
[45] Date of Patent: Dec. 26, 1989

[54] DETACHABLE FLYWHEEL WEIGHTS FOR ALTERING MOTORCYCLE ENGINE PERFORMANCE

[76] Inventor: Charles W. Steahly, 9950 SE. Bullrun Rd., Corbett, Oreg. 97019

[21] Appl. No.: 268,038

[22] Filed: Nov. 7, 1988

[51] Int. Cl.$^4$ ............................ F16C 3/04; F16F 15/22
[52] U.S. Cl. .................................... 74/604; 74/572; 74/573 R
[58] Field of Search ................. 74/572, 573, 574, 604; 123/192 B; 188/378, 218 A

[56] References Cited

U.S. PATENT DOCUMENTS

| 755,952 | 3/1904 | Smith | 74/574 |
| 2,284,515 | 5/1942 | Criswell | 123/192 B |
| 3,337,148 | 8/1967 | Murphy | 74/574 X |
| 3,995,513 | 12/1976 | Amdall et al. | 74/574 |
| 4,712,436 | 12/1987 | Brown | 123/192 B X |

FOREIGN PATENT DOCUMENTS 574585 1/1946 United Kingdom .................. 74/574

Primary Examiner—Rodney M. Lindsey
Attorney, Agent, or Firm—James D. Givnan, Jr.

[57] ABSTRACT

A flywheel weight for removable attachment to a threaded component of a flywheel or crankshaft of an engine to supplement the weight of the flywheel. Set screws additionally lock the weight to the flywheel.

9 Claims, 1 Drawing Sheet

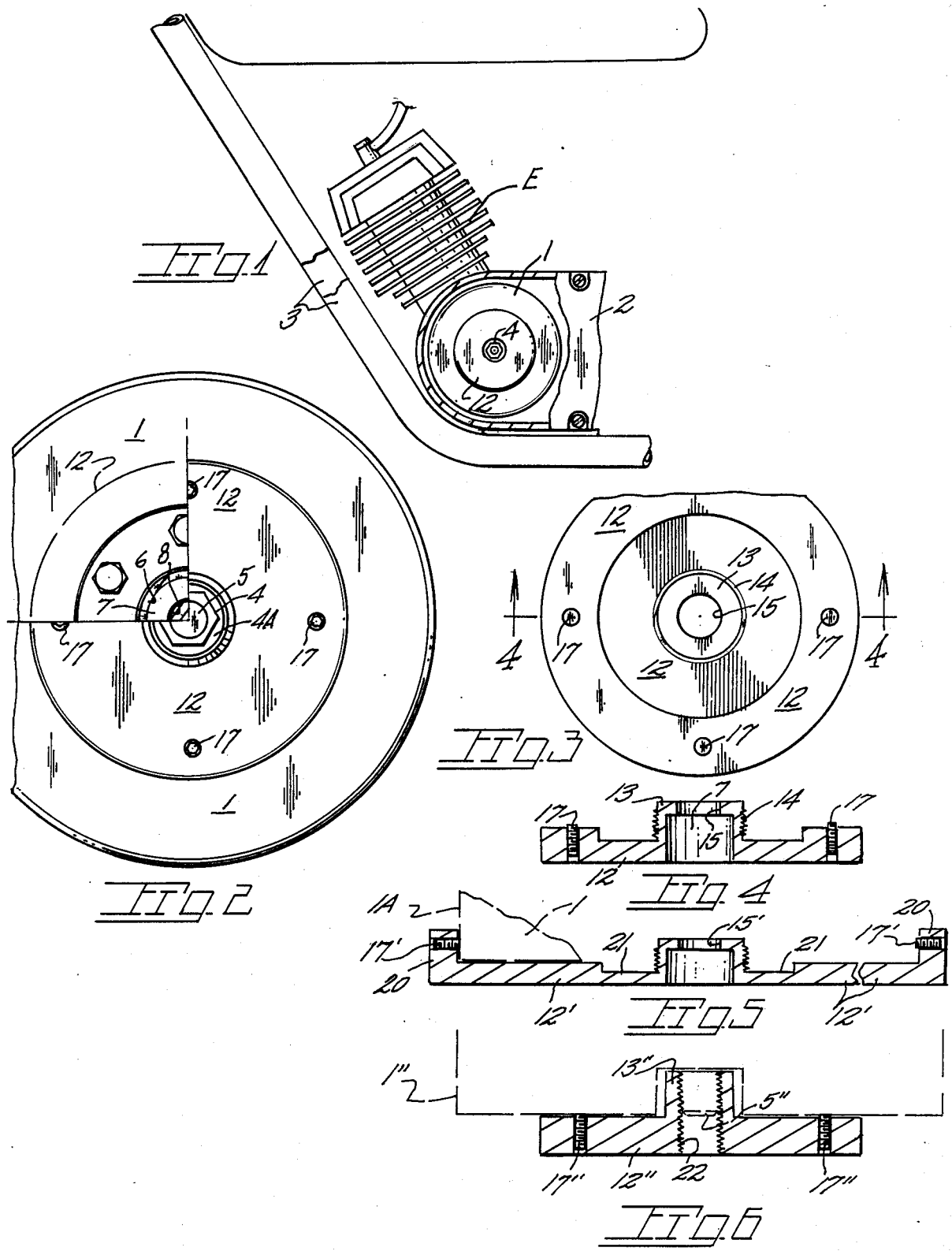

4,889,011

DETACHABLE FLYWHEEL WEIGHTS FOR ALTERING MOTORCYCLE ENGINE PERFORMANCE

BACKGROUND OF THE INVENTION

The present invention pertains generally to a weight for flywheel attachment to permit altering performance of an internal combustion engine.

In small displacement gasoline engines flywheel weight is critical with regard to acceleration characteristics of the engine powered vehicle. For example, in engines normally run at high speeds and where good acceleration is highly desirable, it is common practice to utilize a lightweight flywheel. When such a vehicle is operated at low engine speeds however a certain amount of engine stalling and/or roughness may be experienced. Such a situation is encountered when motorcycles, of the type intended for motorcross competition at high speeds, are used at slow speeds such as in trail riding over very rough terrain. Further, existing motorcycle flywheels are not readily altered to vary their weight to best suit track or trail conditions.

Flywheel modification efforts have included the permanent modification of a flywheel by the welding of a steel ring to the flywheel after machining of the latter.

SUMMARY OF THE PRESENT INVENTION

The present invention is embodied in a flywheel attachment which permits convenient alteration of flywheel weight by the operator to suit the purposes at hand.

In most current motorcycle engines, the flywheel includes female screw threads for the purpose of attaching a tool for removing flywheels. During engine use, however, the flywheel threads may presently serve to permit convenient attachment of an auxiliary or supplemental weight to modify engine performance.

An array of weights, sizes and configurations may be utilized to accomplish present purposes and to be compatible with the several makes and models of motorcycle engines in use.

Utilizing threaded components of existing flywheels precludes the permanent and costly modification of same.

Important objectives include the provision of a threaded flywheel attachment for altering flywheel weight; the provision of such an attachment which permits engine performance to be altered in a simple manner and with common hand tools; the provision of such an attachment for coupling to that end of an engine crankshaft carrying the engine flywheel.

BRIEF DESCRIPTION OF THE DRAWINGS

In the accompanying drawings:

FIG. 1 is a fragmentary side elevational view of a motorcycle showing the present weight in place on an engine flywheel;

FIG. 2 is an enlarged front elevational view of the engine flywheel with the present weight thereon with weight parts broken away;

FIG. 3 is a rear elevational view of the present flywheel weight shown in FIG. 2 but removed from the engine flywheel;

FIG. 4 is a horizontal sectional view taken upwardly along line 4—4 of FIG. 3;

FIG. 5 is a view similar to FIG. 4 but showing a modified weight; and

FIG. 6 is a view similar to FIG. 4 but showing a still further modified form of the present weight.

DETAILED DESCRIPTION OF THE PREFERRED EMBODIMENTS

With continuing attention to the drawings wherein applied reference numerals indicate parts similarly hereinafter identified, the reference numeral 1 indicates a flywheel of an internal combustion motorcycle engine at E.

The flywheel at 1 may include ignition system components and hence constitute a magneto. Typically engine flywheels are housed within a crankshaft cover 2 with vehicle tubular frame members being indicated at 3. The foregoing is intended to generally describe a motorcycle engine equipped with a flywheel 1 which is normally held in place by a nut of the type at 4 and washer 4A in place on the end of a crankshaft end segment 5. Said end segment of the crankshaft typically defines a keyway (not shown) for keyed engagement of the flywheel with said crankshaft end segment. As shown in FIG. 2, small displacement engine flywheels are normally provided with female threads at 6 to receive a flywheel removing tool. The threads define a central recess 7 while a central opening at 8 receives crankshaft end segment 5. The end segment is threaded to receive a nut element as at 4 to hold the flywheel in place. Nut element 4 may be utilized to hold the present weight in place as later explained.

The present flywheel weight is indicated at 12 and includes a boss 13 as viewed in FIG. 3. Boss 13 is provided with external left-hand threads 14 for engagement with flywheel female threads 6. A central opening 15 in the flywheel weight is of a diameter to permit passage over crankshaft end segments 5 during installation of the flywheel weight on the flywheel.

Locking means for the weight are indicated at 17 for engagement with the adjacent surface of the flywheel 1 and may be embodied within arcuately spaced set screws. Accordingly the flywheel weight may be secured in place by reused nut 4 attached to crankshaft end segment 5 after weight installation and by use of locking means 17.

A modified weight at 12' is disclosed in FIG. 5 wherein a peripheral wall 20 may be circumposed about the circular outer surface 1A of the engine flywheel 1 with locking means at 17' being engageable with said outer surface of the flywheel. An annularly machined surface at 21 of the weight provides added clearance for those types of engine flywheels having a protruding annular ring.

FIG. 6 discloses a still further modified weight at 12" for use with those engine flywheels as at 1" having a smooth or unthreaded surface defining a central recess. Weight attachment to flywheel 1" is accomplished by an internally threaded bore at 22 for threaded engagement with threaded crankshaft end segment 5". The modified weight 12" serves as a nut element to confine the flywheel 1" on the crankshaft end segment. Set screws at 17" may be utilized to further accomplish locking of the weight to the flywheel. Structure of the modified weights which is analogous to the initially described weight is identified by prime and double prime reference numerals.

In use, the weight most suitable for the intended use of the vehicle is selected. For example, when utilizing a motorcross type motorcycle for slow speed trail riding it is highly desirable to provide smooth, stall free engine operation at low engine speeds by the addition of weight 12 to the engine flywheel. Such may be accomplished with the present supplemental flywheel weight in a highly convenient manner without alteration of the flywheel and accordingly the engine may again be modified back to its original condition for use in high speed competitive events. An array of weights permits the vehicle owner to readily modify engine performance using only common hand tools. The use of set screws precludes any motion or slippage between weight 12 and the engine flywheel. Further, the set screws may accomplish locking of the weight to the flywheel regardless of a space or gap existing between the inner surface of the weight and the adjacent surface of a flywheel.

A typical range of weights may be from one-half pound to two pounds with weight configuration somewhat determined by clearance between the flywheel and other motorcycle components which clearance will vary with the various makes and models of motorcycles.

While I have shown but a few embodiments of the invention, it will be apparent to those skilled in the art that the invention may be embodied still otherwise without departing from the spirit and scope of the invention.

Having thus described the invention, what is claimed and desired to be secured by Letters Patent is:

1. A flywheel weight for removable attachment to an engine flywheel assembly having a threaded component, said weight comprising,
   a body of disk shape and of suitable mass to alter engine performance and having a central boss, and
   screw threads on said central boss for engagement with the threaded component of the engine flywheel assembly.

2. The flywheel weight claimed in claim 1 wherein said body includes adjustable locking means for engagement with the flywheel assembly.

3. The flywheel weight claimed in claim 2 wherein said locking means are set screws.

4. The flywheel weight claimed in claim 2 wherein said body includes a peripheral wall, said adjustable locking means embodied in set screws carried by said wall.

5. A weight for removable attachment to a threaded end segment of an engine crankshaft equipped with a flywheel, said weight comprising,
   a body of disk shape and of suitable mass to affect engine operation, and
   a central threaded bore in said body engageable with the threaded end segment of the crankshaft.

6. The weight claimed in claim 5 wherein said body includes adjustable locking means engageable with the flywheel.

7. The weight claimed in claim 6 wherein said locking means is a set screw.

8. In combination,
   a crankshaft having an externally threaded end segment,
   a flywheel on said end segment, and
   a flywheel weight of disk shape and having centrally disposed screw threads for threaded engagement with said threaded end segment of said crankshaft whereby the flywheel weight serves to supplement the flywheel.

9. The combination claimed in claim 8 additionally including locking means on said weight for engagement with the flywheel.

* * * * *